United States Patent
Biagiotti et al.

(10) Patent No.: US 8,782,558 B1
(45) Date of Patent: Jul. 15, 2014

(54) METHOD, PROGRAM AND ARRANGEMENT FOR HIGHLIGHTING FAILING ELEMENTS OF A VISUAL IMAGE

(71) Applicants: Advanced Testing Technologies, Inc., Hauppauge, NY (US); Eli Levi, Dix Hills, NY (US)

(72) Inventors: William Biagiotti, St. James, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 14/027,477

(22) Filed: Sep. 16, 2013

Related U.S. Application Data

(60) Provisional application No. 61/730,646, filed on Nov. 28, 2012.

(51) Int. Cl.
*G06F 3/048* (2013.01)

(52) U.S. Cl.
USPC .......................................................... 715/823

(58) Field of Classification Search
None
See application file for complete search history.

(56) References Cited

U.S. PATENT DOCUMENTS

| | | | |
|---|---|---|---|
| 4,523,231 A * | 6/1985 | Therrien | 348/187 |
| 5,668,890 A | 9/1997 | Winkelman | |
| 5,832,122 A | 11/1998 | Shimazaki | |
| 6,502,045 B1 | 12/2002 | Biagiotti | |
| 6,628,828 B1 * | 9/2003 | Stokes et al. | 382/167 |
| 6,807,300 B1 | 10/2004 | Gindele et al. | |
| 7,126,631 B1 * | 10/2006 | Minemier | 348/246 |
| 7,382,928 B2 | 6/2008 | Wong et al. | |
| 8,239,130 B1 * | 8/2012 | Upstill et al. | 701/426 |
| 8,457,397 B2 | 6/2013 | Sakai et al. | |
| 8,537,144 B2 * | 9/2013 | Matthijs et al. | 345/204 |
| 2001/0030667 A1 * | 10/2001 | Kelts | 345/854 |
| 2003/0095147 A1 * | 5/2003 | Daw | 345/771 |
| 2003/0208712 A1 * | 11/2003 | Louden et al. | 714/742 |
| 2003/0227483 A1 * | 12/2003 | Schultz et al. | 345/763 |
| 2004/0174320 A1 * | 9/2004 | Matthijs et al. | 345/30 |
| 2009/0016609 A1 * | 1/2009 | Zakrzewski et al. | 382/190 |
| 2009/0040367 A1 * | 2/2009 | Zakrzewski et al. | 348/370 |
| 2011/0090371 A1 * | 4/2011 | Cote et al. | 348/237 |
| 2012/0051730 A1 * | 3/2012 | Cote et al. | 396/90 |
| 2012/0081580 A1 * | 4/2012 | Cote et al. | 348/231.99 |
| 2012/0131507 A1 * | 5/2012 | Sparandara et al. | 715/833 |
| 2012/0147010 A1 * | 6/2012 | Schmidt et al. | 345/440 |

* cited by examiner

*Primary Examiner* — Matt Kim
*Assistant Examiner* — Maryam Ipakchi
(74) *Attorney, Agent, or Firm* — Brian Roffe

(57) ABSTRACT

Method, system and computer program for visually highlighting identified failing or erroneous pixel elements of a two-dimensional electronic image. Different visual highlighting techniques are stored in memory. A user selects one of the highlighting techniques using a user interface. A processor applies the selected technique(s) to the image and displays the image on a display with visual indications of the failing pixel elements. The techniques include coloring the pixels with a boundary box enclosing all of the erroneous pixels, enclosing separate irregular-shaped groupings of the pixels with a contour-type boundary line, and coloring pixels and enclosing each within a separate box. In the final technique, video lines with some failing pixels, but within allowable tolerances, will have those pixels colored differently and each pixel is enclosed within the same color box. In all cases, it is possible to convert the test image to black and white for display.

23 Claims, 5 Drawing Sheets

METHOD, PROGRAM AND ARRANGEMENT FOR HIGHLIGHTING FAILING ELEMENTS OF A VISUAL IMAGE

CROSS REFERENCE TO RELATED APPLICATION

This application claims priority of U.S. provisional patent application Ser. No. 61/730,646 filed Nov. 28, 2012, now expired, which is incorporated by reference herein.

FIELD OF THE INVENTION

The present invention relates generally to methods and systems for highlighting failing elements of a visual image and a computer or other processing device that includes computer software and computer programs that, when executed, highlight failing elements of a visual image. More specifically, the present invention relates to techniques for visually identifying erroneous elements of a two-dimensional electronic image.

BACKGROUND OF THE INVENTION

In video signal and video image verification, it is difficult for a test operator to comprehend which portion of an image-under-test that is failing, when the test operator presented with typical test result metrics, such as the line numbers and sample numbers of the failing image points.

For example, in an aviation platform or environment, various sections of a video image displayed on a cockpit monitor rely upon subsystems and sensors that are typically distributed throughout the aircraft. Not all of these subsystems and sensors contain built-in testing capabilities, and those that do are limited to independent functional verification within the subsystem or sensor itself. When untested and/or testing-limited subsystems and sensors provide signals to a video generation module, there is an ambiguity that exists that is difficult to resolve.

SUMMARY OF THE INVENTION

A method for visually highlighting identified failing pixel elements of a two-dimensional electronic image in accordance with the invention includes storing a plurality of different, non-manual or computer-implemented visual highlighting techniques in at least one memory component, enabling a user to select one or more of the plurality of highlighting techniques using a user interface, and retrieving the selected highlighting technique(s) from the memory component(s) and executing the retrieved highlighting technique(s) on the image to cause display of the image to be displayed on a display with visual indications of the failing pixel elements. The visual highlighting techniques may be permanently stored or temporarily stored in the memory component depending, for example, on the type of memory component.

In one embodiment when the image is a color image, one of the highlighting techniques is to display failing pixel elements in a first color along with a boundary box enclosing all of the failing pixels in the first color. The image may be displayed in its original color and the first color is red. It is also possible to provide functionality to the computer and enable such functionality through a user interface associated with the computer in order to convert the color image to a black and white image, the black and white image being displayed with the failing pixel elements.

In another embodiment when the image is a color image, one of the highlighting techniques is to display separate, irregular-shaped groupings of failing pixel elements within a boundary line of a first color. The image may be displayed in its original color and the first color is red. It is also possible to provide functionality to the computer and enable such functionality through a user interface associated with the computer in order to convert the color image to a black and white image, the black and white image being displayed with the boundary line around the failing pixel elements.

In another embodiment when the image is a color image, one of the highlighting techniques is to color failing pixel elements in a first color, enclose each pixel within a box of the first color, color failing pixels in video lines within allowable tolerances in a second color and enclose each failing pixels in video lines within allowable tolerances within a box of the second color. The image may be displayed in its original color, the first color is red, and the second color is green. It is also possible to provide functionality to the computer and enable such functionality through a user interface associated with the computer in order to convert the color image to a black and white image, the black and white image being displayed with the failing pixel elements.

Any of the foregoing embodiments and techniques may be combined in different combinations and permutations, e.g., all of the techniques may be offered on the same computer or other processing device, or only a subset of the techniques, possibly a discrete subset on each of a plurality of different devices.

A computer program in accordance with the invention is embodied in (non-transitory) computer-readable media on any type of processing device, e.g., a mainframe computer, a tower computer, a laptop computer, a notebook computer, a notepad, a smartphone, etc. Usually, the computer would include a processor, memory, display or monitor and associated user interface and circuitry for functionality. Generally, the computer program visually highlights identified failing pixel elements of a two-dimensional electronic image, and to this end is configured to enable a user to select, using a user interface, one or more of a plurality of different, computer-implemented visual highlighting techniques stored in at least one memory component, retrieve the selected highlighting technique(s) from the memory component(s) using hardware and/or software of the device executing the program, execute the retrieved highlighting technique(s) using hardware and/or software of the device executing the program, and cause display of the image to be displayed on a display (or monitor if present) with visual indications of the failing pixel elements derived from the execution of the retrieved highlighting technique(s).

The same variations to the method described above may be implemented by the computer program through appropriate design in a manner known to those skilled in the art.

An arrangement for visually highlighting identified failing pixel elements of a two-dimensional electronic image in accordance with the invention includes at least one memory component containing a plurality of different visual highlighting techniques, a user interface configured to enable selection of each highlighting technique from the memory component(s), a processor that converts the selection via the user interface into retrieval of the selected highlighting technique(s) from the memory component(s) and executes the retrieved highlighting technique(s) on the image, and a display coupled to the processor and that is directed/commanded by the processor to display the image with visual indications of the failing pixel elements.

By analyzing a final video signal from a video generation module (that implements the method or executes the computer program described above) for allowed content and then isolating a detected error to a specific region of a cockpit display, it is possible to easily troubleshoot the problem by recognizing that specific aircraft parameters (as measured by subsystems or sensors) are displayed in specific display locations. Hence, the visual location of the detected error or failure becomes paramount.

BRIEF DESCRIPTION OF DRAWINGS

A more complete appreciation of the present invention and many of the attendant advantages thereof will be readily understood by reference to the following detailed description of the invention when considered in connection with the accompanying drawings in which.

DETAILED DESCRIPTION OF THE INVENTION

Figure 1:
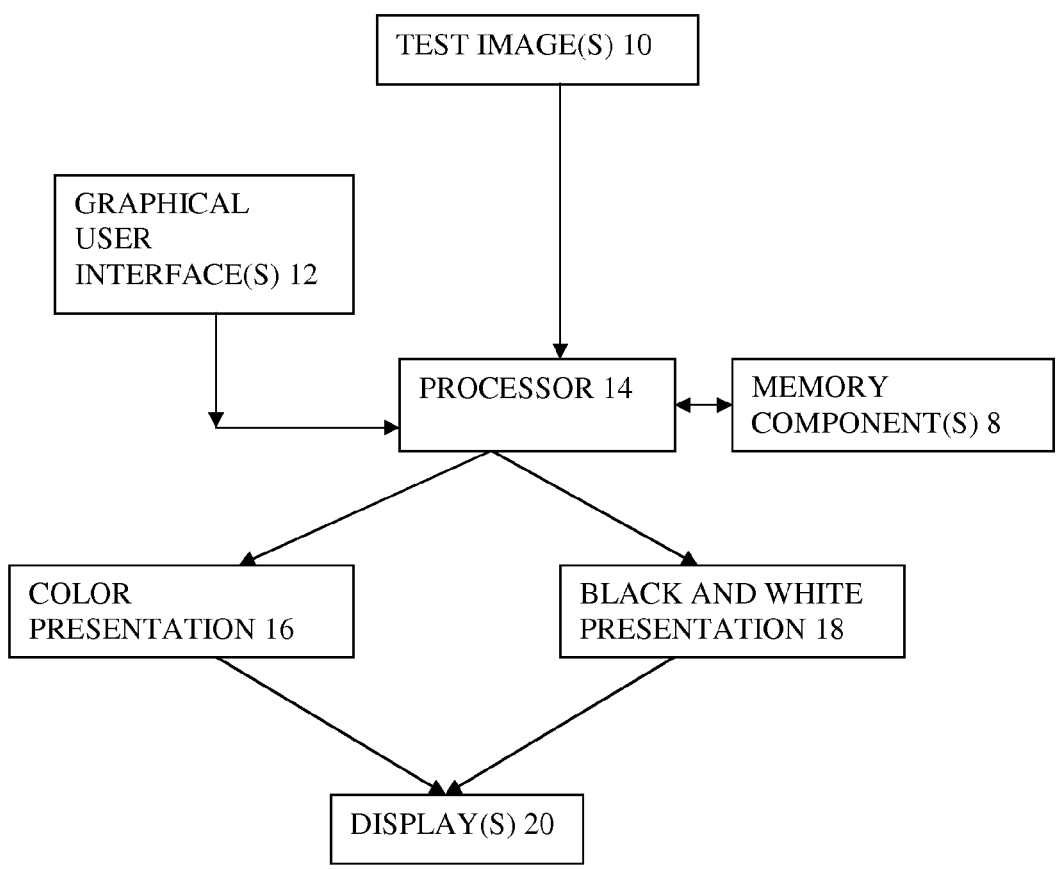
FIG. 1 is a schematic of major components and processing stages of techniques in accordance with the invention.

Due to the exceptional ability of the human mind to view and analyze a visual image, it is far more efficient for a test operator to view a reconstructed video image as derived from the sampled data points and to visually highlight one or more portions of the image in such a way that it is obvious as to what is being highlighted, rather than to consider numerical results. It has been discovered that no single presentation method is best for all visual images. For instance, if a method were to illuminate erroneous pixels as red on a primarily red image, there would be no visual differentiation and the operator would not be able to interpret the issue.

The present invention recognizes these limitations and presents multiple techniques (up to six in one embodiment) of how to display errors on a test image 10. The techniques are selectable by the test operator from a GUI panel of a software program as controlled by a computer, which computer comprises usual components such as a user interface 12 and a processor 14. The techniques are stored in one or more memory components 8 that are accessed by the processor 14, upon command, to retrieve the selected technique(s).

All of the techniques may be presented for selection by the user or only a portion of the techniques may be presented for selection by the user. Some techniques might not be suitable for a test image and therefore, a conditional assessment may be made about which techniques to present based on the test image, and only those offered to the user for selection using a user interface. It is also possible to restrict the selection based on other factors, such as complexity of the test image, processing capability of the computer executing the program or other device on which the method is performed and financial considerations.

The techniques presented generally allow for operation with a broad spectrum of images and groupings of erroneous pixel elements. More specifically, in a reconstructed video image, the erroneous pixels can be presented on a display 20 after having been identified and processed by processor 14 to provide a color presentation 16 and/or a black and white presentation 18. Display 20 represents either a single display associated with the user interface being used by the user (and which might be the same if a touch screen is used), or multiple displays on different devices. The different devices may be situated at different locations, e.g., the images and erroneous pixels may be sent using a network to a location remote from the user performing the method. This network may be the Internet, an intranet, a network using satellite communications and equivalents.

Figure 3:
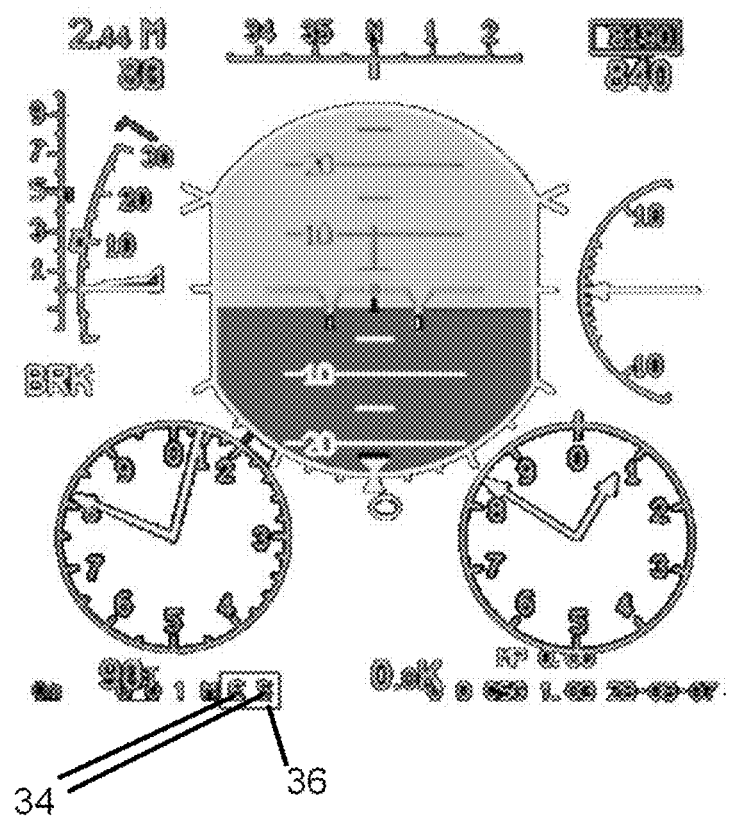
FIG. 3 is a view showing an image including failing pixel elements that may be in a specific color and a boundary box enclosing all of the failing pixels, and which may also be in a specific color.
Figure 4:
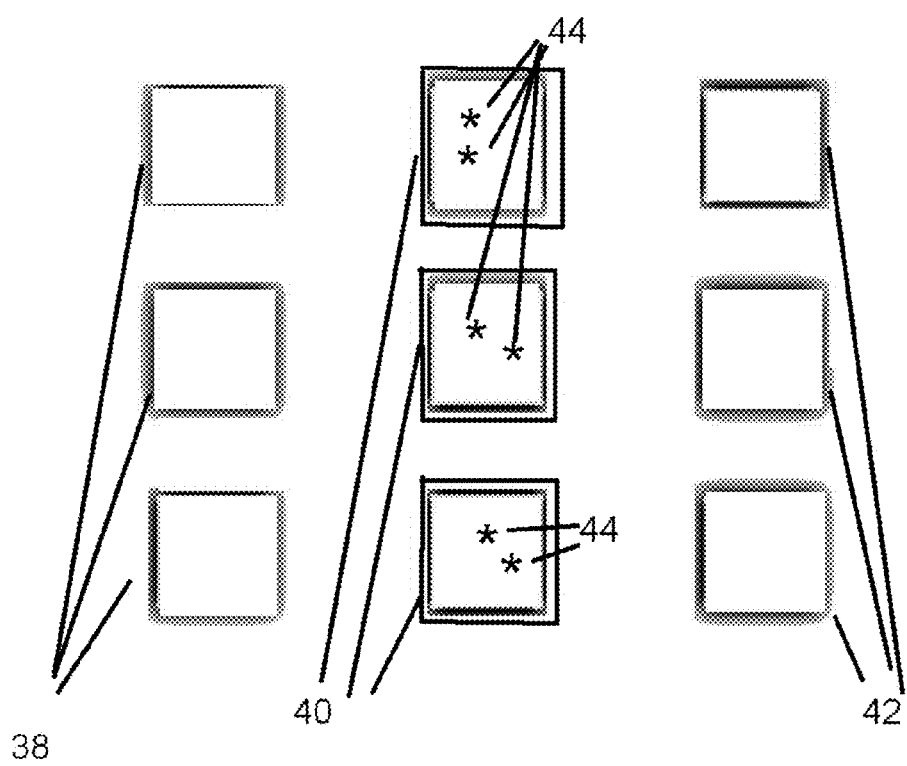
FIG. 4 is a view showing separate groupings of failing pixel elements within a boundary line that may be a specific color.
Figure 5:
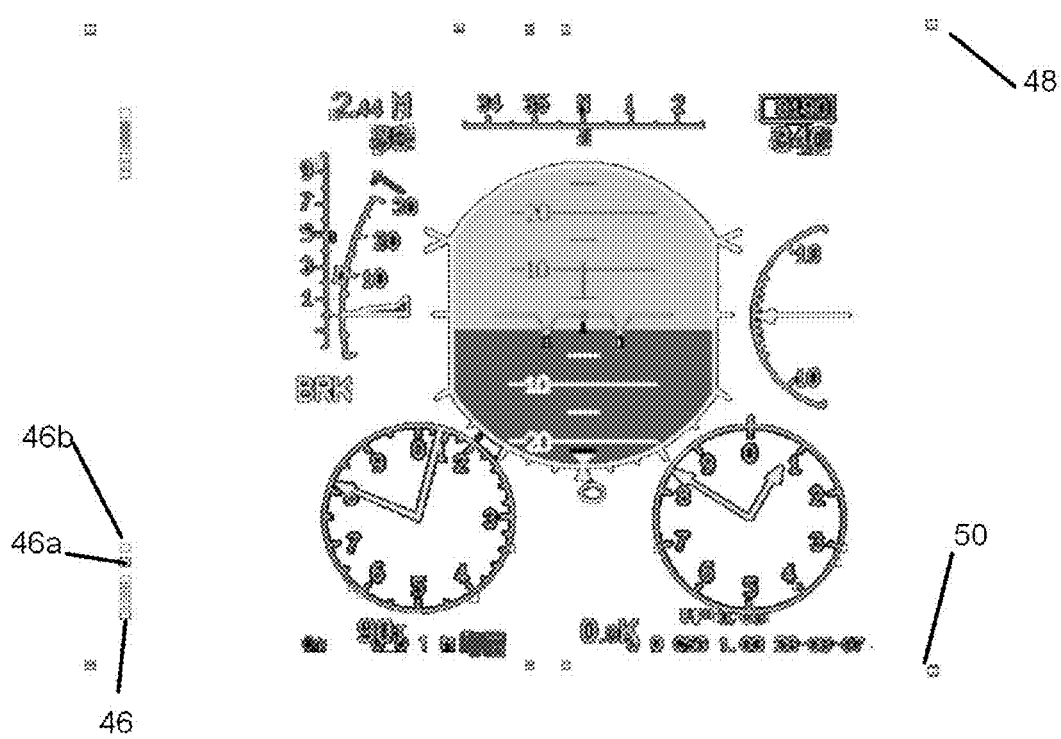
FIG. 5 is a view showing video lines and in which, in one video line, failing pixels are enclosed in a box that may be colored differently that a box surrounding other failing pixels.

Accordingly, the processor 14 is configured to implement one or more of the following selectable techniques that have been previously created and stored in one or more memory components (not shown), i.e., the techniques may be used individually or in any combination with one another on different parts of the test image 10 (to the extent possible):

a. Color presentation—first variant—the original image is displayed in full color, i.e., its original color, and erroneous pixels 34 are colored red with a single red boundary box 36 enclosing all of the erroneous pixels (see FIG. 3).

b. Black and white presentation—first variant—the original image is converted into a black and white image in a process known to those skilled in the art, and erroneous pixels are colored red with a single red box enclosing all of the erroneous pixels.

c. Color presentation—second variant—the original image is displayed in full color and separate irregular shaped groupings of erroneous pixels 44 are enclosed with a red contour-type boundary line 40 while other groupings 38, 42 of non-erroneous pixels are not enclosed with contour-type boundary line) (see FIG. 4).

d. Black and white presentation—second variant—the original image is converted into a black and white image in a process known to those skilled in the art, and separate irregular shaped groupings of erroneous pixels are enclosed with a red contour-type boundary line.

e. Color presentation—third variant—the original image is displayed in full color and erroneous pixels are colored red and each pixel is enclosed within a separate red box 46a. Separately, video lines 46, 48, 50 with some failing pixels, but within allowable tolerances, will have those pixels colored green and each pixel is enclosed within a green box 46b (see FIG. 5).

f. Black and white presentation—third variant—the original image is converted into a black and white image in a process known to those skilled in the art, and erroneous pixels are colored red and each pixel is enclosed within a separate red box. Separately, video lines with some failing pixels, but within allowable tolerances, will have those pixels colored green and each pixel is enclosed within a green box.

Creation of the techniques may be undertaken by a programmer producing software to run on the platform or assembly of hardware and software intended to be used to implement the visual highlighting techniques. Thus programming would be readily ascertainable by those skilled in the art in view of the disclosure herein. Thus, one skilled in the art would be able to determine how to implement the various techniques described above in a computer program using the disclosure herein, and their knowledge of programming.

The use of red and green colors does not limit the invention and represent a preferred color scheme. Thus, other colors may be used in accordance with the invention without deviating from the scope and spirit thereof.

The techniques described above may be used with any techniques that identify pixel elements that fail or are erroneous in a two-dimensional electronic signal. The current assignee's patent and patent applications include details of methods and computer programs to perform this failing pixel element identification, which may be integrated with the techniques disclosed herein. For example, the disclosures of U.S. Pat. No. 6,502,045, U.S. patent application Ser. No. 13/238, 588 filed Sep. 21, 2011, and U.S. patent application Ser. No. 13/934,502 filed Jul. 3, 2013 are relevant and may be incorporated into this invention and vice versa. All of these are therefore incorporated by reference herein.

Figure 2:
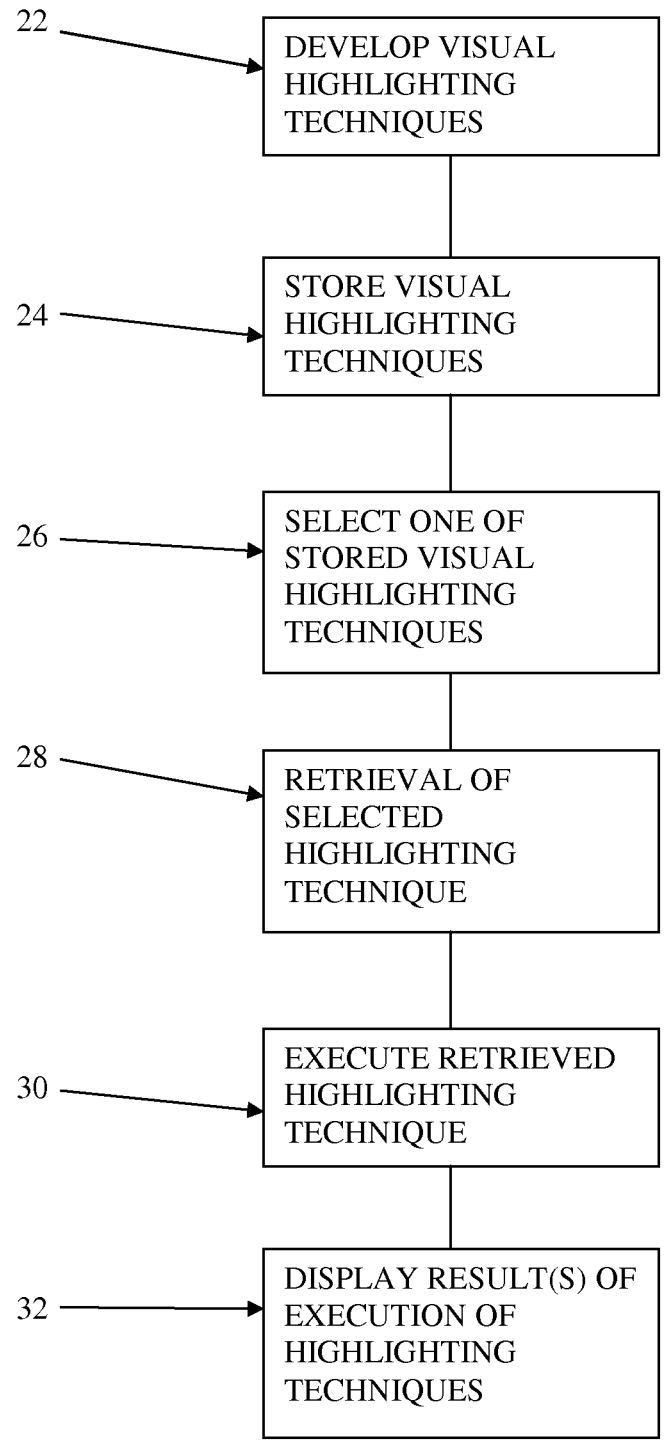
FIG. 2 is a flow chart of an exemplifying method in accordance with the invention.

Using the schematically depicted elements shown in FIG. 1, a method in accordance with the invention for visually highlighting identified failing pixel elements of a two-dimensional electronic image will be described with reference to FIG. 2. Initially, visual highlighting techniques are developed using a computer and user interface (step 22), this development being in accordance with the objectives of the visual highlighting techniques described above. That is, one skilled in the art, knowing what is desired from each visual highlighting technique, can readily create a computer program, subroutine or algorithm that will, when executed, effect the desired visual highlighting technique. In step 24, the visual highlighting techniques are stored, e.g., in a memory component (RAM, ROM, etc.). This concludes the preparatory stage of the method. Once stored, the techniques can be used immediately thereafter and/or at any time thereafter when desired, even weeks, months or years later. As time passes, additional highlighting techniques may be created, e.g., derivatives of those disclosed herein, and stored together with the techniques disclosed herein.

In step 26, in an operational stage when a user wants to apply one of the techniques, the user selects one of the plurality of highlighting techniques using a user interface, i.e., views the available techniques on a screen of a monitor or display and scrolls down using a mouse or points if the display is a touch screen to effect the selection. In step 28, the selected technique is retrieved from the memory component(s). In step 30, the retrieved highlighting technique is executed using the test image as input to cause display of the image to be displayed on a display with visual indications of the failing pixel elements, step 32.

It is possible to construct a computer program or implement the method in accordance with the invention to enable selection of different parts of a single test image and apply different techniques to the different parts. This can be effected through use of a user interface.

In the context of this document, computer-readable medium or media could be any means that can contain, store, communicate, propagate or transmit a program for use by or in connection with the method or arrangement disclosed above. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having thus described a few particular embodiments of the invention, various alterations, modifications, and improvements will readily occur to those skilled in the art. Such alterations, modifications and improvements as are inherent or made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

The invention claimed is:

1. A method for visually highlighting identified failing pixel elements of a two-dimensional electronic image, comprising:

storing a plurality of different, computer-implemented visual highlighting techniques in at least one memory component, the step of storing the highlighting techniques including storing a first highlighting technique that is executable to change a color of each failing pixel element of a two-dimensional electronic image and individually highlight each of the color-changed failing pixel elements of the two-dimensional electronic image;

enabling a user to select at least one of the highlighting techniques from the at least one memory component using a user interface; and retrieving the user-selected highlighting technique from the at least one memory component and executing the retrieved highlighting technique on the image to cause the image to be displayed on a display with a visual indication of the failing pixel elements.

2. The method of claim 1, wherein the image is a color image and the first highlighting technique is to change the color of each of the failing pixel elements to a first color, display each of the color-changed failing pixels in the first color and to also display a boundary box enclosing all of the color-changed failing pixels in the first color.

3. The method of claim 2, wherein the image is displayed in its original color and the first color is red.

4. The method of claim 2, further comprising converting the color image to a black and white image, the black and white image being displayed with the color-changed failing pixel elements having the first color.

5. The method of claim 1, wherein the image is a color image, the step of storing the highlighting techniques comprising storing a second highlighting technique that is executable to display separate groupings of the color-changed failing pixel elements within a boundary line of a first color.

6. The method of claim 5, wherein the image is displayed in its original color and the first color is red.

7. The method of claim 5, further comprising converting the color image to a black and white image, the black and white image being displayed with the boundary line around the color-changed failing pixel elements.

8. The method of claim 1, wherein the image is a color image, the step of storing the highlighting techniques comprising storing a second highlighting technique that is executable to provide color to each of the failing pixel elements by changing them to a first color, enclose each of the color-changed failing pixel elements within a box of the first color, provide color to failing pixel elements in video lines by changing them to a second color and enclose each of the failing pixel elements in video lines within a box of the second color.

9. The method of claim 8, wherein the image is displayed in its original color, the first color is red, and the second color is green.

10. The method of claim 8, further comprising converting the color image to a black and white image, the black and white image being displayed with the color-changed failing pixel elements having the first color and the color-changed failing pixel elements having the second color.

11. A computer program embodied in non-transitory computer-readable media that visually highlights identified failing pixel elements of a two-dimensional electronic image, the computer program being configured to:
   enable a user to select, using a user interface, at least one of a plurality of different, computer-implemented visual highlighting techniques stored in at least one memory component, at least one of the highlighting techniques being executable to change a color of each failing pixel element of a two-dimensional electronic image and individually highlight each of the color-changed failing pixel elements of the two-dimensional electronic image;
   retrieve the selected highlighting technique from the at least one memory component; execute the retrieved highlighting technique; and
   cause the image to be displayed on a display with a visual indication of the failing pixel elements derived from the execution of the retrieved highlighting technique.

12. The computer program of claim 11, wherein the image is a color image and the first highlighting technique is to change the color of each of the failing pixel elements to a first color, display each of the color-changed failing pixels in the first color and to also display a boundary box enclosing all of the color-changed failing pixels in the first color.

13. The computer program of claim 12, wherein the image is displayed in its original color and the first color is red.

14. The computer program of claim 12, wherein the computer program is further configured to convert the color image to a black and white image, the black and white image being displayed with the color-changed failing pixel elements having the first color.

15. The computer program of claim 11, wherein the image is a color image and a second one of the highlighting techniques is executable to display separate groupings of the color-changed failing pixel elements within a boundary line of a first color.

16. The computer program of claim 15, wherein the image is displayed in its original color and the first color is red.

17. The computer program of claim 15, wherein the computer program is further configured to convert the color image to a black and white image, the black and white image being displayed with the boundary line around the color-changed failing pixel elements.

18. The computer program of claim 11, wherein the image is a color image and a third one of the highlighting techniques is executable to provide color to each of the failing pixel elements by changing them to a first color, enclose each of the color-changed failing pixel elements within a box of the first color, provide color to failing pixel elements in video lines by changing them to a second color and enclose each of the failing pixel elements in video lines within a box of the second color.

19. The computer program of claim 18, wherein the computer program is further configured to convert the color image to a black and white image, the black and white image being displayed with the failing pixel elements having the first color and the color-changed failing pixel elements having the second color.

20. An arrangement for individually visually highlighting each of at least one identified failing pixel element of a two-dimensional electronic image, comprising:
   at least one memory component containing a plurality of different visual highlighting techniques at least one of the highlighting techniques being executable to change a color of each failing pixel element of a two-dimensional electronic image and individually highlight each of the color-changed failing pixel elements of the two-dimensional electronic image;
   a user interface configured to enable selection of each of the plurality of highlighting techniques from said at least one memory component;
   a processor that converts the selection via said user interface into retrieval of the selected highlighting technique from said at least one memory component and executes the retrieved highlighting technique on the image; and
   a display coupled to said processor and being directed by said processor to display the image with a visual indication of the failing pixel elements.

21. The method of claim 1, wherein the image is a video image.

22. The computer program of claim 11, wherein the computer program is configured to visually highlight identified failing pixel elements of a video image.

23. The arrangement of claim 20, wherein the image is a video image.

* * * * *